Figure 1:
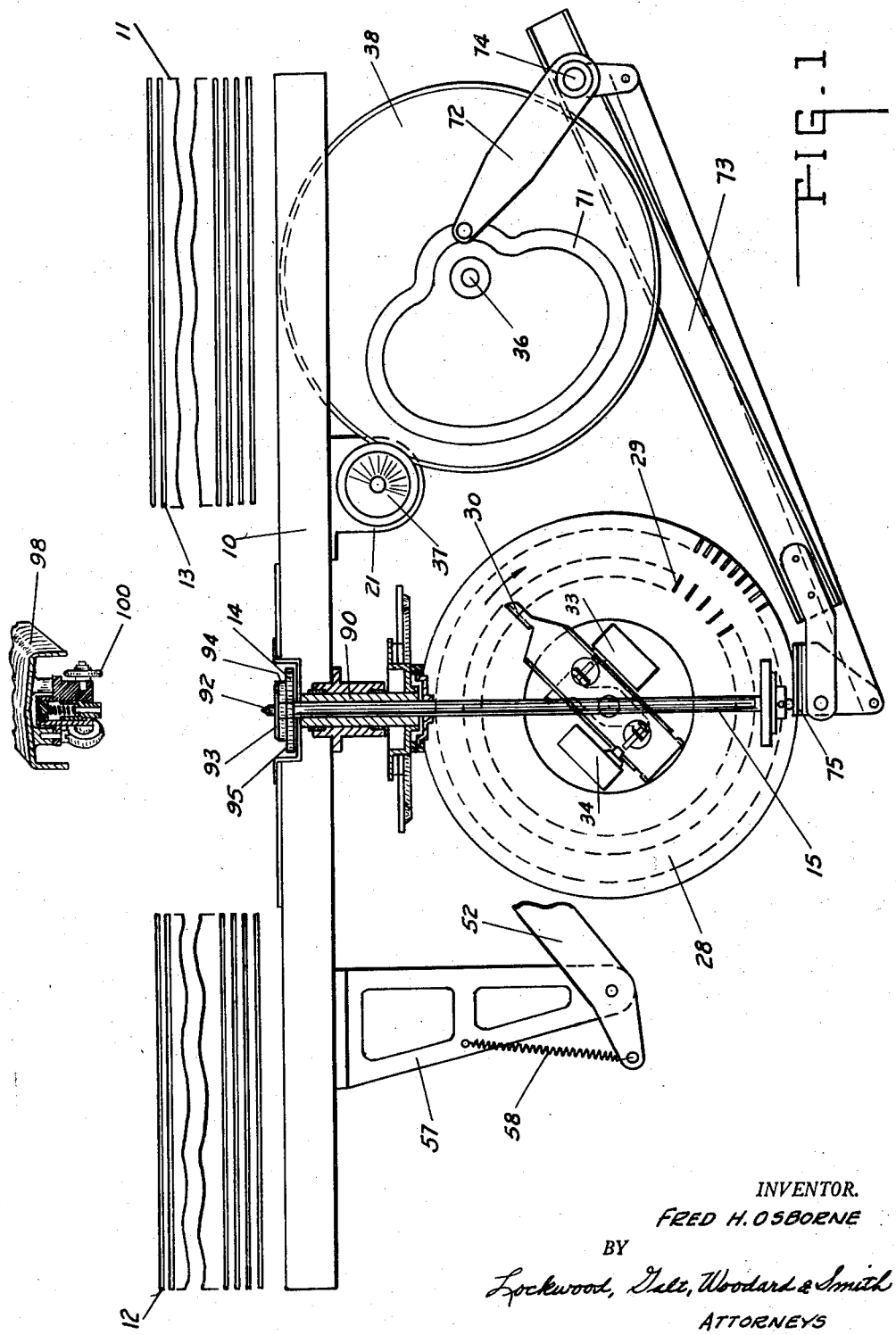

Sept. 9, 1958  F. H. OSBORNE  2,851,273
AUTOMATIC PHONOGRAPH
Filed June 16, 1952  10 Sheets-Sheet 1

INVENTOR.
FRED H. OSBORNE
BY
Lockwood, Gale, Woodard & Smith
ATTORNEYS

Sept. 9, 1958 F. H. OSBORNE 2,851,273
AUTOMATIC PHONOGRAPH
Filed June 16, 1952 10 Sheets-Sheet 2

INVENTOR.
FRED H. OSBORNE
BY
Lockwood, Galt, Woodard & Smith
ATTORNEYS

Sept. 9, 1958 F. H. OSBORNE 2,851,273
AUTOMATIC PHONOGRAPH
Filed June 16, 1952 10 Sheets-Sheet 4

INVENTOR.
FRED H. OSBORNE
BY
Lockwood, Galt, Woodard & Smith
ATTORNEYS

Sept. 9, 1958  F. H. OSBORNE  2,851,273
AUTOMATIC PHONOGRAPH
Filed June 16, 1952  10 Sheets-Sheet 6

INVENTOR.
FRED H. OSBORNE
BY
Lockwood, Galt, Woodard & Smith
ATTORNEYS

Sept. 9, 1958

F. H. OSBORNE 2,851,273

AUTOMATIC PHONOGRAPH

Filed June 16, 1952

10 Sheets-Sheet 8

INVENTOR.
FRED H. OSBORNE
BY
Lockwood, Galt, Woodard & Smith
ATTORNEYS

Sept. 9, 1958  F. H. OSBORNE  2,851,273
AUTOMATIC PHONOGRAPH
Filed June 16, 1952  10 Sheets-Sheet 9

INVENTOR.
FRED H. OSBORNE
BY
Lockwood, Galt, Woodard & Smith
ATTORNEYS

Sept. 9, 1958  F. H. OSBORNE  2,851,273
AUTOMATIC PHONOGRAPH
Filed June 16, 1952  10 Sheets-Sheet 10
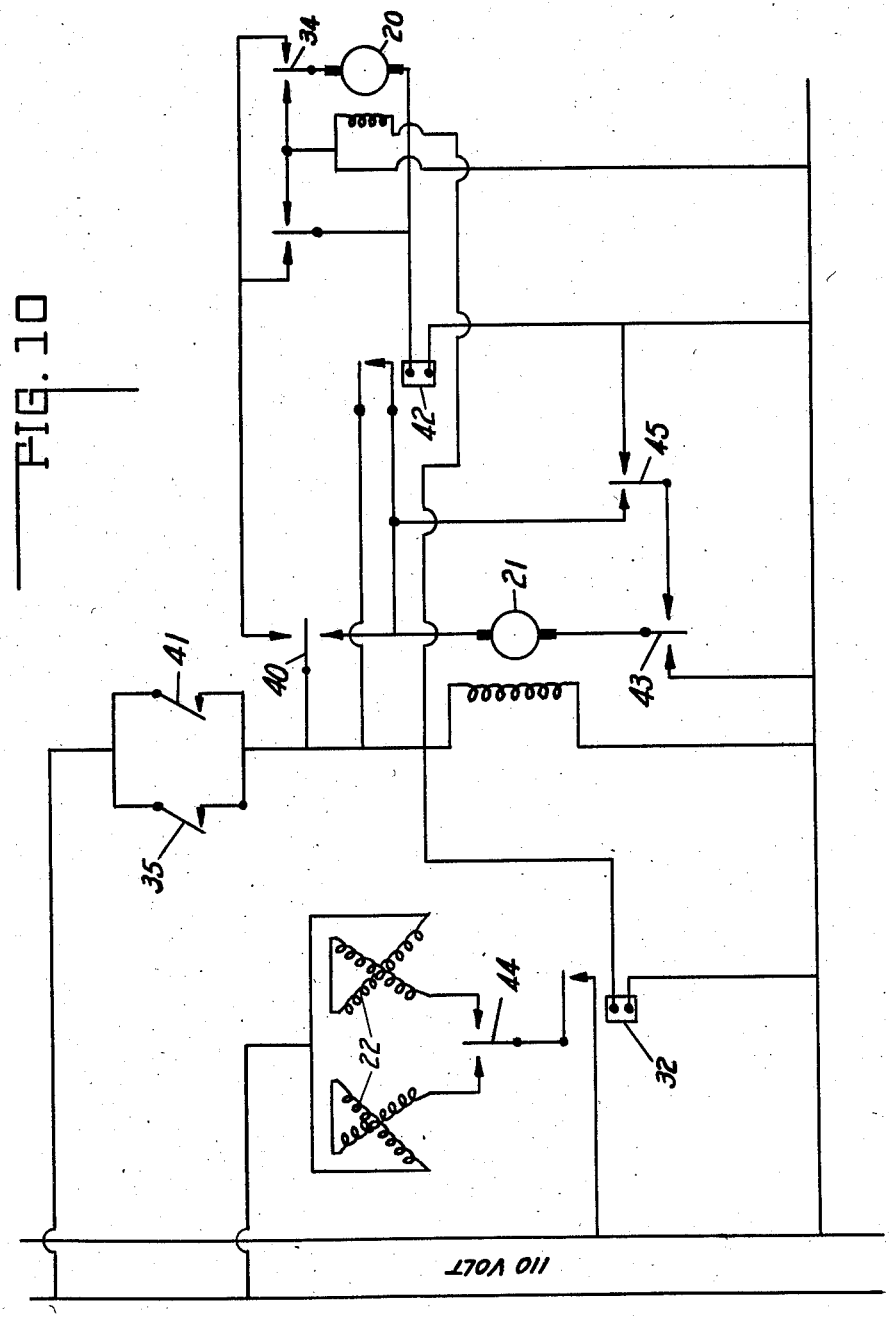
INVENTOR.
FRED H. OSBORNE
BY
Lockwood, Galt, Woodard & Smith
ATTORNEYS United States Patent Office 2,851,273
Patented Sept. 9, 1958

2,851,273

AUTOMATIC PHONOGRAPH

Fred H. Osborne, Snyder, N. Y., assignor to The Rudolph Wurlitzer Company, Chicago, Ill., a corporation Application June 16, 1952, Serial No. 293,787

10 Claims. (Cl. 274—10)

This invention relates to an automatic phonograph, more particularly a coin operated selective type of record changer, reference being had to my application for Letters Patent Serial No. 705,713, filed October 25, 1946, now U. S. Patent No. 2,631,856, issued Mar. 17, 1953, entitled "Automatic Phonograph," and my application jointly with Charles J. Hull, Serial No. 209,476, filed February 5, 1951, now U. S. Patent No. 2,725,235, issued Nov. 29, 1955, entitled "Automatic Phonograph."

It is the object of this invention to provide a record changing mechanism for an automatic phonograph of a character to substantially increase the number of selections capable of being selectively reproduced, the structure herein disclosed being capable of selectively reproducing as many as one hundred and four selections as distinguished from the above last-mentioned application disclosing a record changer for reproducing forty-eight selections and the first-mentioned application disclosing a record changer for reproducing twenty-four selections. This is accomplished through the provision of a pair of duplicate magazines each having twenty-six record supporting swinging trays to be selectively swung to a position over a turntable operating intermediate the dual magazines, and wherein opposed reproducers are employed for selectively engaging and reproducing either the upper or the lower side of the selected record.

The invention as pertains to the large number of selections which may be presented for reproduction, lies in the provision of a selector cam contoured to provide two opposed camming profiles, one to effect selection of a record from one of said magazines for reproduction of the upper side of the record, and the other to effect selection of a record from the same magazine for reproduction of the lower side thereof, an immediate neutral profile is concentrically arranged with respect to the cam shaft for neutralizing one magazine while a selection is being made from the other magazine. In association with said selector cam, and rotatable therewith, there is also provided a tone arm selector and turntable motor reversing cam for selectively rendering effective either the upper or lower tone arm and causing rotation of the turntable in the proper direction.

A further and most important object of the invention is to provide a record changer of the selective type which will automatically and without manual adjustment of any kind, cause intermingled records of different physical characteristics and speed of reproduction, to be reproduced. Thus, the record changer of this invention is capable of automatically reproducing ten inch records of the present 78 R. P. M. type having a small centering aperture, and records of the present seven inch 45 R. P. M. type having the enlarged centering aperture.

Through the medium of the physical characteristics of the existing records, the mechanism automatically adjusts itself to the different speeds and also to the feed-in positioning of the reproducer as well as the tripping position thereof according to the particular type of record. Thus, an operator may load the magazines with both types of records of the above groups promiscuously and the record changer will automatically adjust itself to the particular speed and structure characteristics thereof for reproduction.

A further feature of the invention resides in the accurate positioning of the selector reproducer cams. Due to the large number of records to be selected from each magazine according to the positioning of one contoured section of the selector cam and within a relatively short portion thereof, said cam must be accurately positioned to present the desired record for reproduction and prevent causing more than one record to be removed from the magazine. This has been heretofore accomplished by a toothed indexing wheel, but herein due to the increased accuracy required it is accomplished through a balancing of the selector by a reversable motor, the reversable motor operating to cause the selector to come to rest at an accurately indexed position.

Other features of the invention will be hereinafter and more fully set forth and described in the following specifications and disclosed in the accompanying drawings.

Figure 2:
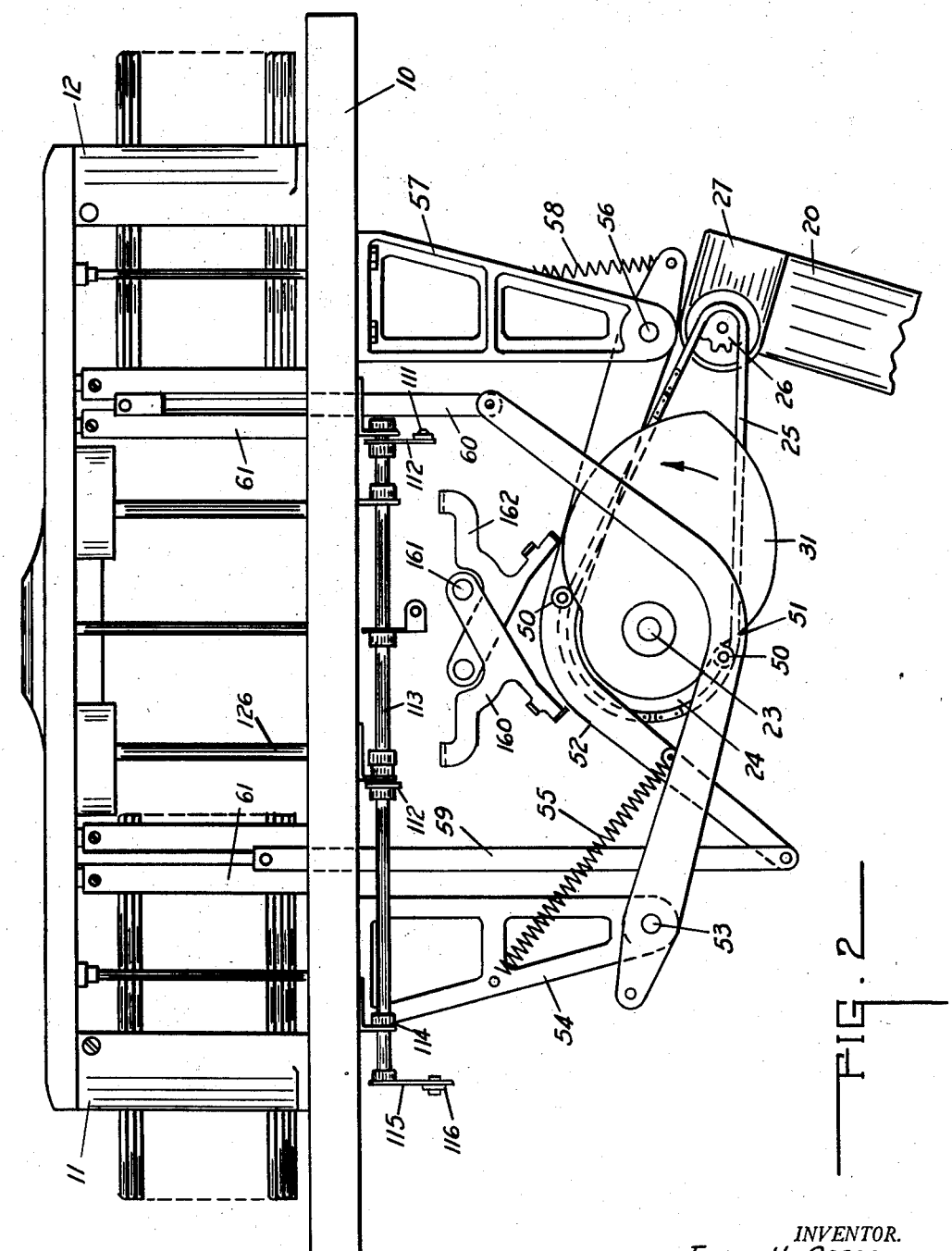
Figure 3:
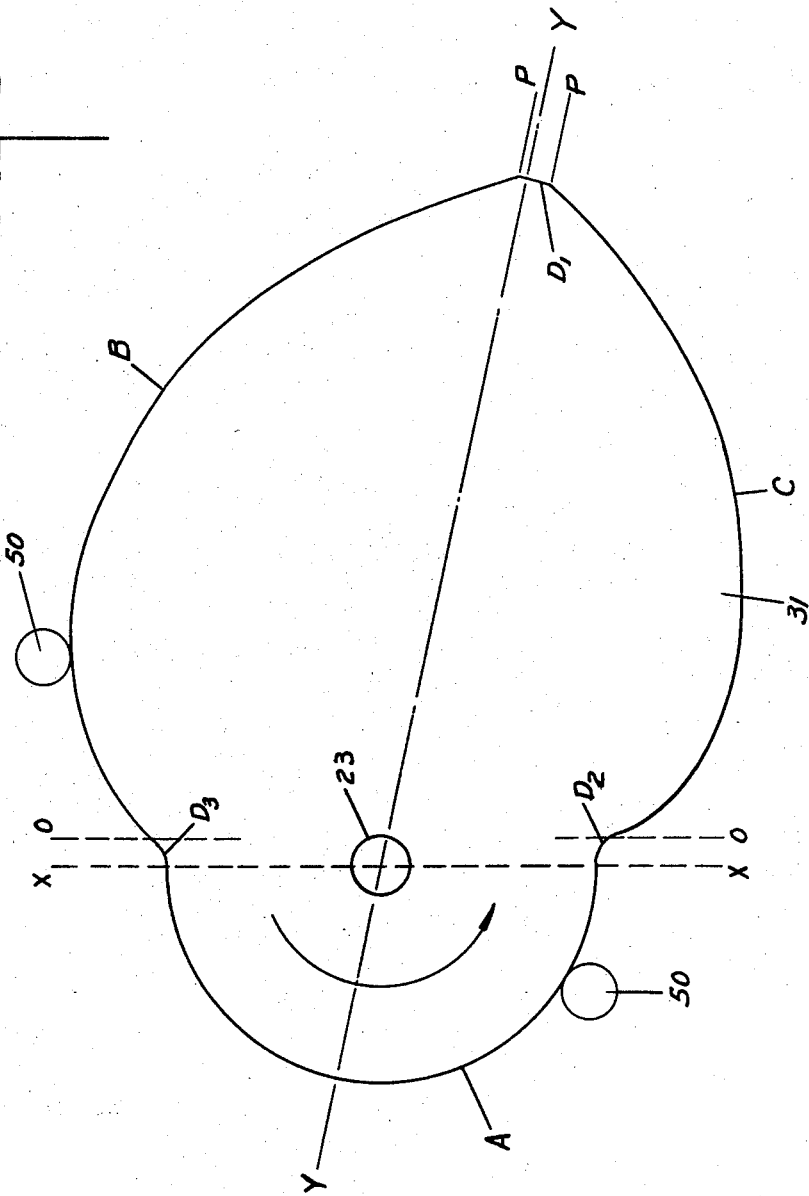
Figure 4:
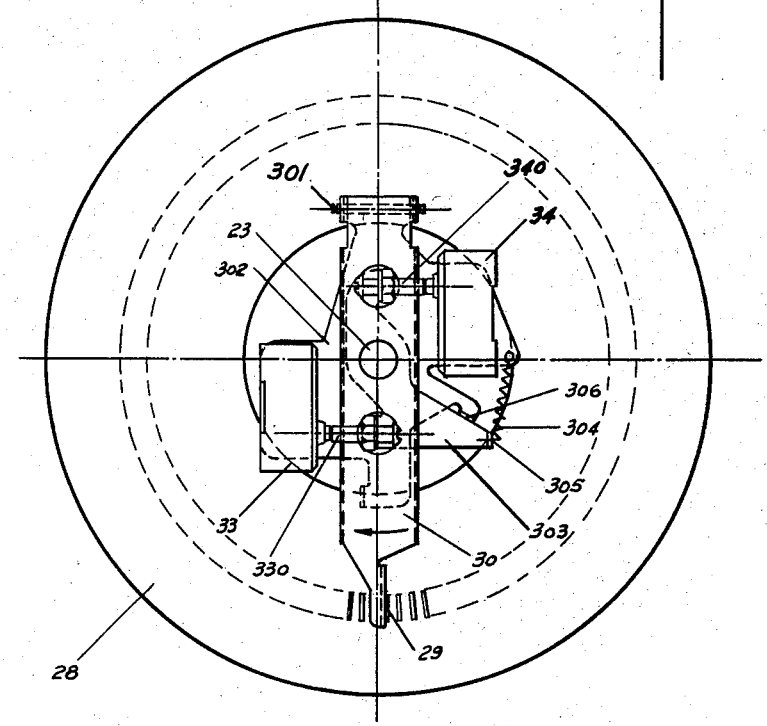
Figure 5:
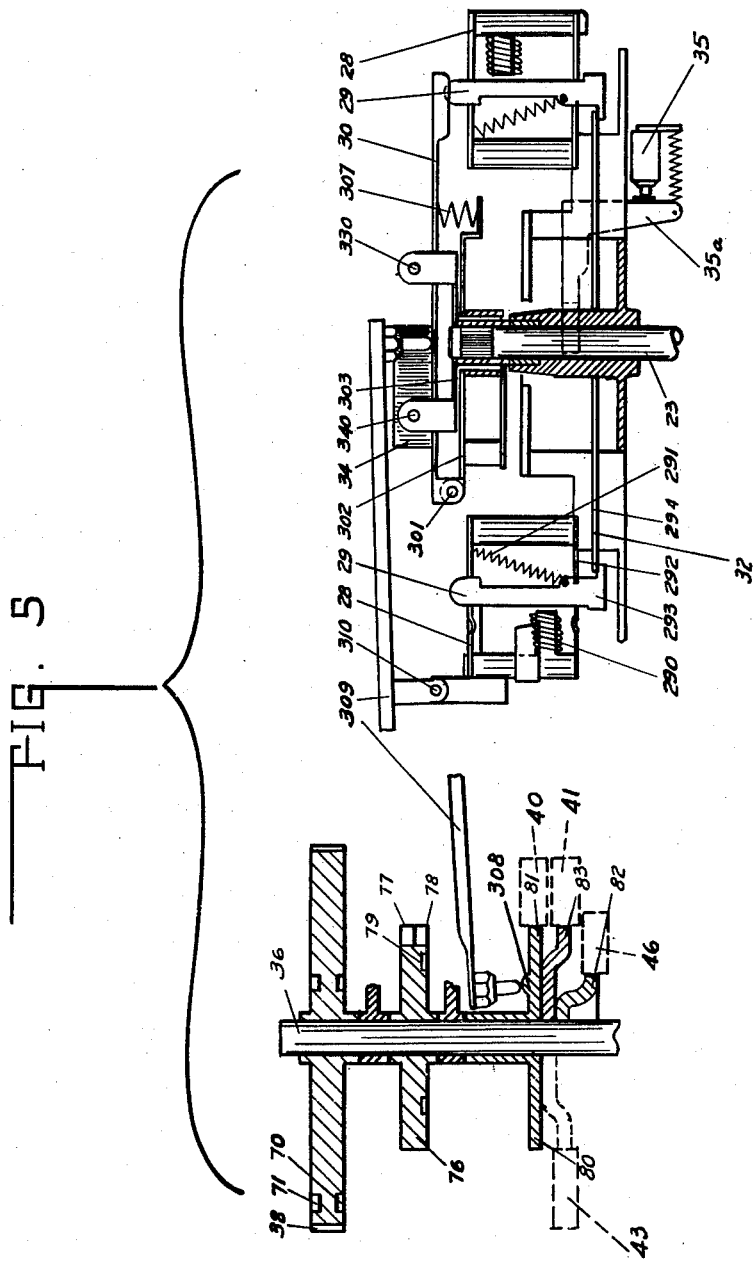
Figure 6:
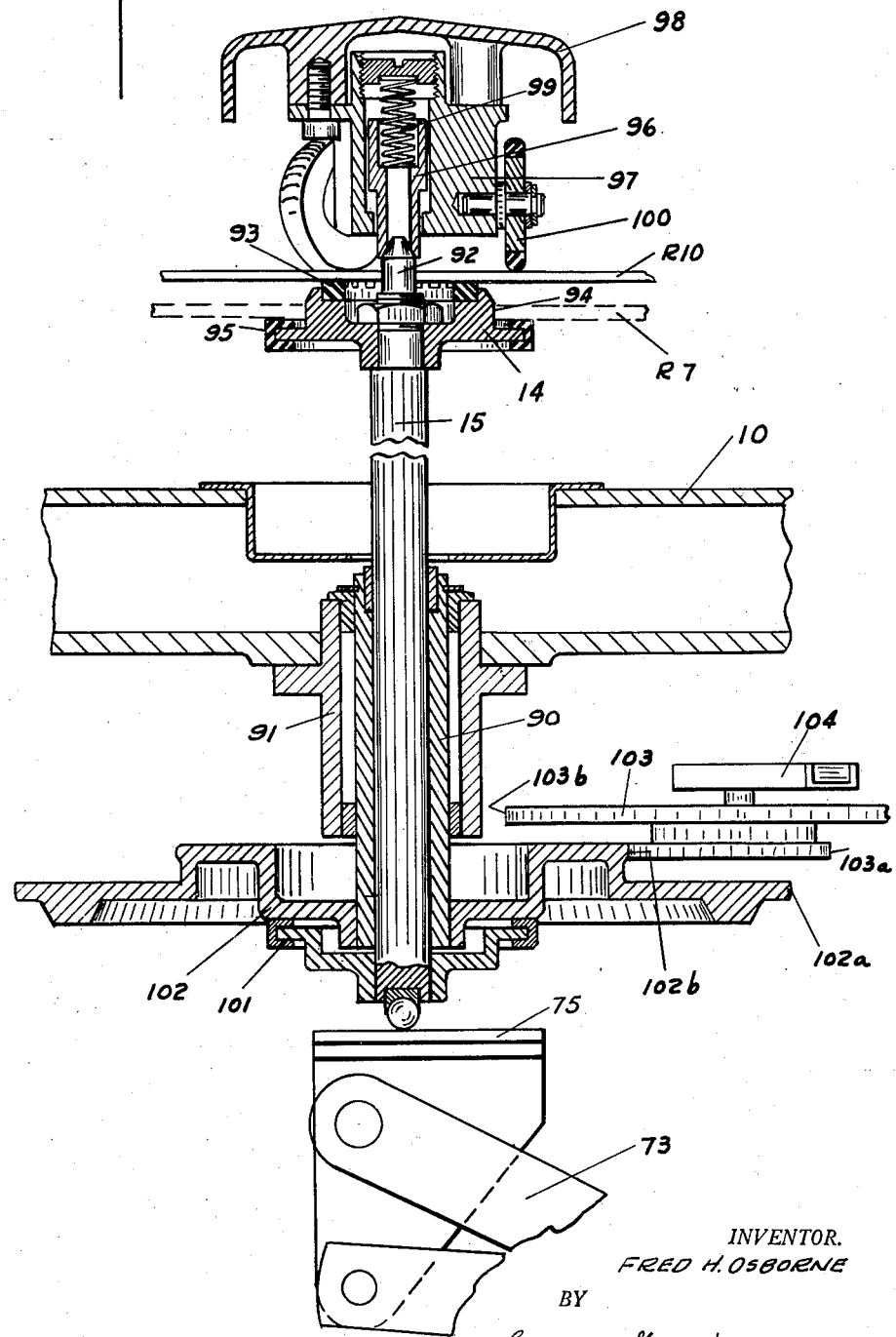
Figure 7:
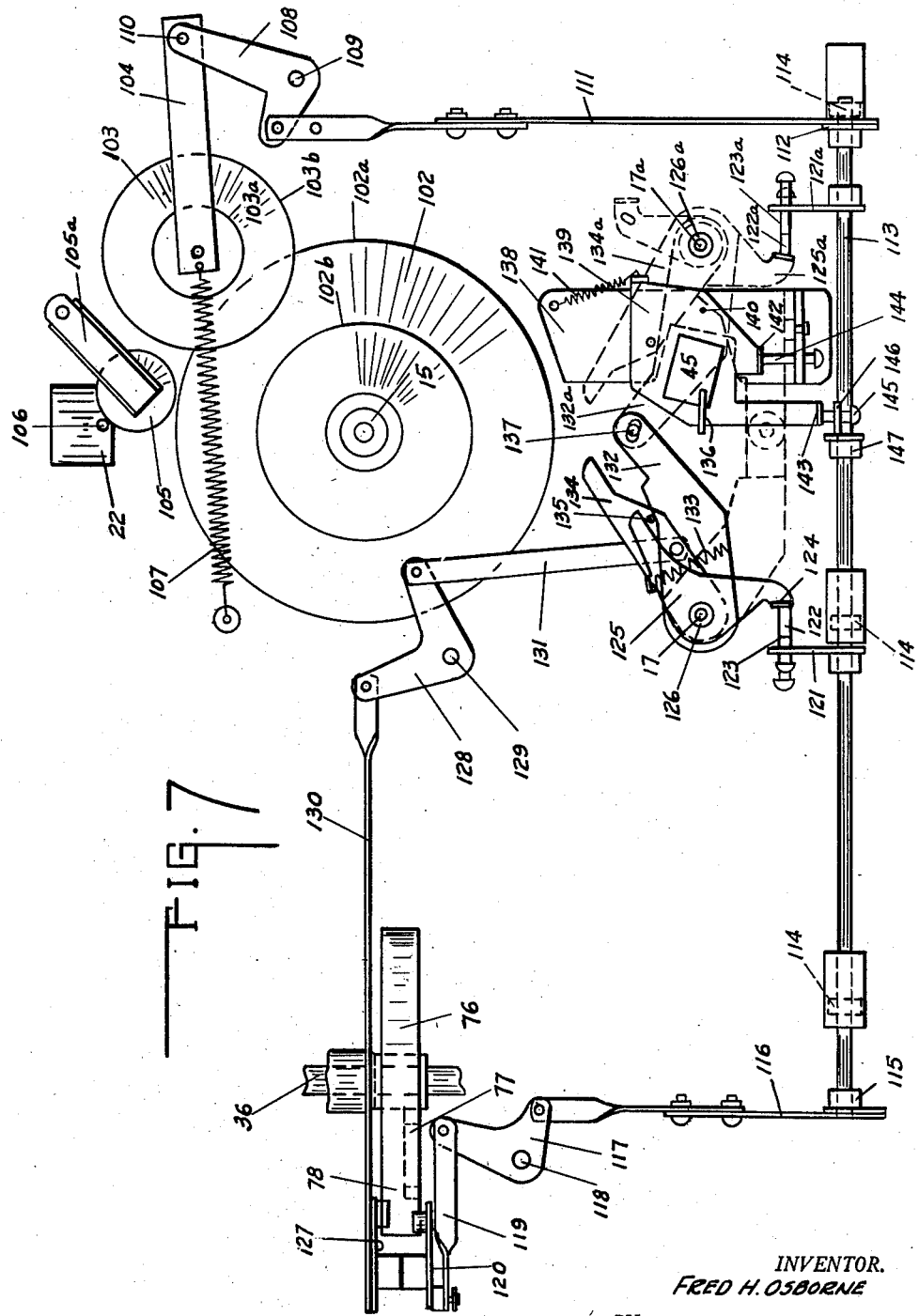
Figure 8:
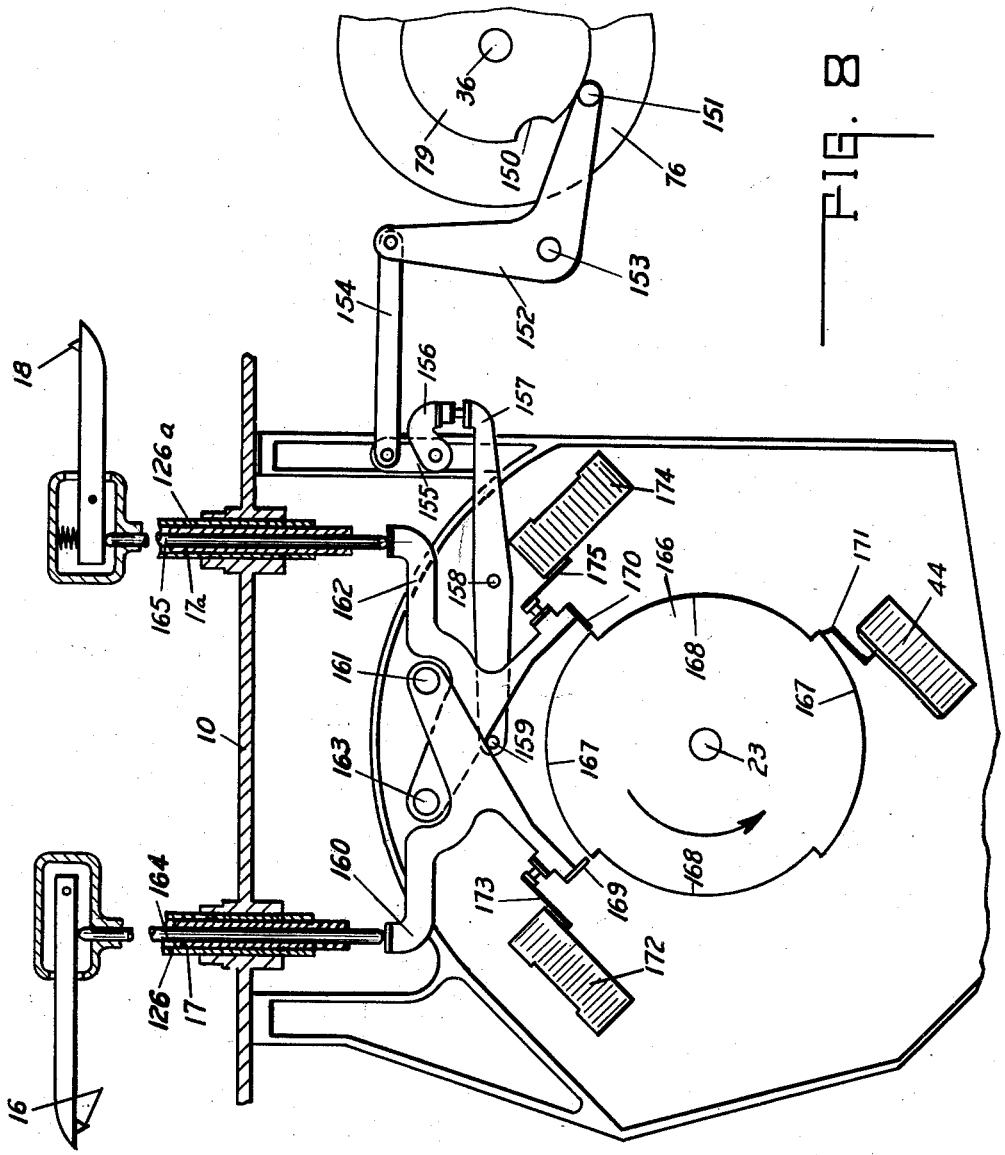
Figure 9:
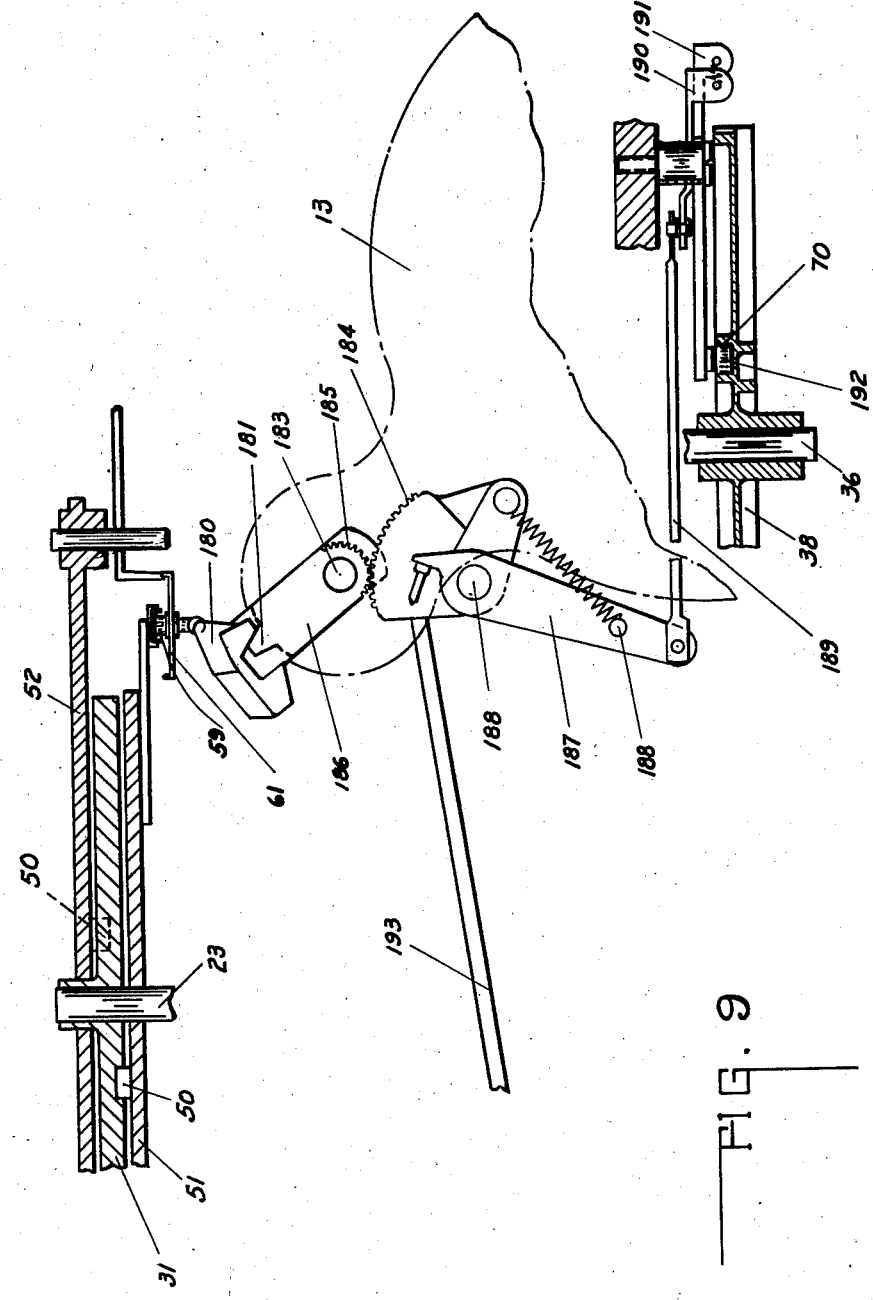

The full nature of the invention will be understood from the accompanying drawings and the following description:

Fig. 1 is a front elevation of the record changing mechanism with parts removed, broken away, and in section. Fig. 2 is a rear elevation of the record changing mechanism with parts removed and broken away. Fig. 3 is a layout of the selector cam. Fig. 4 is a front detailed view of the record selector mechanism, with parts removed. Fig. 5 is a central vertical section through the selector mechanism of Fig. 4 with parts removed and parts in elevation, and showing a schematic view of the main cam shaft and control cams. Fig. 6 is a vertical section through the turntable and turntable drive, with parts in elevation and with parts removed. Fig. 7 is a schematic layout of the turntable drive control for variable speeds and including the tone arm feed-in and trip switch adjustment means and controls. Fig. 8 is a schematic elevation of the tone arm selecting and control mechanism for selectively reproducing the upper or lower side of a record. Fig. 9 is a plan view of the record tray take out mechanism with parts removed. Fig. 10 is a wiring diagram of the circuits and controls for the record changing mechanism.

In the drawings there is shown a record changing device supported upon a base plate 10 which mounts at opposite ends thereof the dual magazines indicated generally at 11 and 12. Said magazines, as heretofore disclosed in the abovementioned applications, each mounts a series or column of superimposed swinging trays 13, each tray being formed to support in centered relation therewith a record to be reproduced whether of a seven inch or a ten inch diameter. The records are selected and reproduced by causing a selected tray to be swung on its pivotal mounting outwardly from the magazine to an adjacent position in axial alignment with a vertically reciprocating turntable 14 mounted on the upper end of a rotating turntable shaft 15.

The turntable is adapted to pass through the record supporting tray and pick up either a record R10 (10 inch 78 R. P. M.) or a record R7 (7 inch 45 R. P. M.). The record is thus raised to a position to have either its upper or its under side reproduced selectively by an upper side reproducer 16 mounted on a shaft 17 or an under side reproducer 18 mounted on a shaft 17a (Fig. 8). Upon completion of the reproduction of the record the tone arm is swinging clear of the record and the record is lowered by the downward movement of the turntable with its drive shaft to redeposit the record on the tray, and the tray is then swung back into its magazine.

In general, for accomplishing the above there is provided a selector motor 20 which is operatively connected with a selector device and selector cam as will be hereinafter described. For effecting the swinging movement of the record supporting tray 13, raising and lowering the turntable, and positioning the tone arms, there is provided a main cam shaft motor 21 operably connected with a cam shaft having a series of control cams for this purpose as hereafter more particularly described. Upon the selected record being positioned for reproduction upon the turntable, the turntable is rotated at a selected speed by the turntable motor 22. The circuits of said motors are controlled through various switches for causing them to function in relation to each other in a manner to be hereinafter more particularly described, and as daigrammed in Fig. 10.

Selector control

Supported below the base plate 10 there is mounted a selector cam shaft 23 which is driven by a sprocket wheel 24 through a sprocket chain 25. Said sprocket chain is driven by a sprocket 26 through a reduction gear box 27 from the selector motor 20. Surrounding the shaft 23 there is provided a selector disk 28 having a series of magnetically actuated selector pins 29 which are caused to project forwardly of the selector disk upon being magnetically released through a remote control selector.

Mounted about the selector shaft 23 there is a scanning stop arm 30 which is indirectly driven thereby and caused to rotate in a clockwise direction until arrested by a selectively projected selector pin. When thus arrested a selector cam 31, which is secured to the selector shaft 23, is arrested in its selecting position.

Upon being thus arrested, a micro type position switch 33 is actuated to stop the motor 20 and complete a dynamic breaking action thereto. However, there will be coasting sufficient to actuate a micro type level switch 34 which removes the dynamic breaking action and applies reverse polarity on the armature of the selector motor 20, reversing said motor. Through such reversing action the arm 30 is moved counterclockwise slightly to neutralize its coasting movement sufficient to break the circuit to the motor 20 through the level switch 34. If in its reverse movement it goes too far, the motor again is operated through closing of the switch 33 until it finally comes to rest at an accurately determined position as will be more specifically described in connection with Figs. 4 and 5.

Upon the remote control selection being made, as from a wall box or a selecting panel of the phonograph, and the closing of the coin or like switch, one of the stop pins is actuated which operates a wobble plate 29A (Fig. 5) on the selector disk to close an over ride switch 35, as hereafter described. The switch 35 closes the circuit to the main cam shaft motor 21 which drives cam shaft 36 through a speed reduction gearing 37 and cam gear 38 for the purpose of raising the reproducer, swinging it free of the record, lowering the turntable and returning the reproduced record to its magazine. At the same time the field of the selector motor 20 is conditioned and a transfer switch 40 is operated by cam actuation from said cam shaft to stop the main cam shaft motor 21 after the full cycle switch 41 has been operated slightly ahead of the operation of the transfer switch, to maintain the control circuit closed upon cancellation of the selector pin which causes the over ride switch 35 to open the circuit therethrough.

The conditioned selector motor 20 is then caused to drive the stop arm 30 and selector cam 31 until the selection is made and the motor stopped as above described. Upon the selection thus being made through the positioning of the cam 31, the main motor cam relay 42 is operated to again start the main cam motor 21 through camming action of the cam shaft 36 in the manner hereinafter described. The record selected by the positioning of the selector cam 31 is swung into position to be picked by the turntable, the turntable is raised to lift the record to reproducing position, the reproducer is fed in and set to the record. The transfer switch 40 is cam actuated by the cam 81 (Fig. 5) to be re-positioned to its original position, and a play switch 43 is cam operated from the lobe 83 on the shaft 36 to close the circuit to the amplifier, at the same time breaking the circuit to the cam shaft 36 to bring it to rest. Thereupon the turntable is rotated through the energizing of one of the fields of the turntable motor 22 according to the position of a motor reversing switch 44 (Fig. 8). Said reversing switch 44 is selective of the direction of rotation of the turntable depending upon whether the under side or the upper side of the record is to be reproduced, which is determined in accordance with the actuated selector pin 29.

Upon completion of the play of the record a trip switch 45 (Fig. 7) is actuated upon the reproducer feeding into the trip grooves of the record which energizes the main cam shaft motor 21, causing it to again drive the cam shaft 36 which opens the play switch 43 to the amplifier by the lobe 83 (Fig. 5) and closes a mute switch 46 through the lobe 82. Thereupon the full cycle switch 41 is opened by the lobe 83 on the cam shaft 36, the cams and lobes carried thereby having completed a full cycle ready for the next selection and operation, reference being had to the schematic wiring diagram of Fig. 10. It should be noted that lobe 83 operates switch 41 when at one position, and switch 43 when displaced 180 degrees.

Selector cam

The selector cam 31 is shown in Figs. 2 and 3, said cam being secured upon and rotatable by the selector cam shaft 23 according to the position of the stop arm 30. The contour of the cam embodies three sections, a semi-circular neutral section 9 lying on one side of the line x—x passing through the shaft 23; a curved section B lying on one side of the line y—y; and intermediate sections D1, D2 and D3. Riding on the profile of the cam through the cam follower rollers 50, and in opposed relation to each other, there is provided a pair of selector arms 51, 52. The arm 51 is pivoted at 53 upon a depending bracket 54 and biased into cam engagement by a spring 55. The arm 52 is pivoted at 56 to the other side of the cam from a depending bracket 57 and is biased into cam engagement by a spring 58. Pivotally connected to the free end of the arm 52 there is an upwardly extending selector rod 59 to be positioned by the arm 52 for selecting a record from the magazine 11. A similar selector rod 60 is pivotally connected to the free end of the arm 51 for selecting a record from the magazine 12.

Said selector arms are so related that selections are made from the magazine 11 by the arm 52 controlled by the profiles of sections B and C, and from the magazine 12 by the arm 51 controlled by the profiles of said sections. The semi-circular section A is concentric with the cam shaft 23 and so related to sections B and C that when the cam is moved counterclockwise to engage arm 52 on section B or C, arm 51 will remain in neutral position, riding on the concentric curved section A. Therefore, as arm 52 is moved up or down to raise or lower the selector rod 59, according to the position of the cam 31, there will be no movement of the arm 51 so that the selector rod carried by arm 51 will remain in a neutral non-selecting position. Conversely, when the cam is rotated to a position whereby the selector rod 60 will ride upon sections B and C, it in turn will be positioned to select a record from the magazine 12, while the arm 52 and its rod 59 remain in ineffective non-selecting position due to its follower 50 riding on the neutral concentric curved section A.

The profiles of sections B and C are each divided into twenty-six parts, each representing a record in one of the respective magazines. Upon a record being selected through section B, the upper side will be reproduced and when selected through section C, the lower side will be reproduced, or vice versa. This results from the action of the cam 166 (Fig. 8) associated therewith. However, the effective profiles of sections B and C extend only from the line O—O to the line P—P. The line P—P divides the far end of the sections by a neutral profile having a curvature with its radial center at the cam shaft 23 so that when the follower reaches the section D1, the movement of the selector rod will be arrested, selecting thte same record while shifting its reproduction from the upper side to the underside. Similarly, sections D2 and D3 intermediate the lines O—O and X—X provide transition points through which either selector arm shifts from record selection to neutral non-selecting position. Thus, each of the selections D1, D2 and D3 are dwell points or dead spots in the profile of the cam to permit of a dwell intermediate the transition from selecting position to non-selecting, or from the upper to the lower side of the record selected.

The selector rods operate in the guideways 61, effecting interconnection with the selected record tray and its takeout mechanism in the manner heretofore illustrated and described in the above last-mentioned application for Letters Patent in respect to Fig. 3 thereof.

Selector mechanism

The selector control with its selector cam has been described in general, the selector mechanism therefor being now described in detail. The selector pins 29, of which there are one hundred and four annularly positioned in concentric relation with the selector cam shaft 23 to project through apertures in the plate 28, are individually released by a remotely selected solenoid 290 (Fig. 5) to be projected forwardly by a tension spring 291 from latching engagement with a latching plate 292. Each of said pins is provided with a head 293 engaging the peripheral edge of a wobble plate 294. Thus, upon the solenoid 290 being energized, selector pin is projected forwardly into the path of the stop arm 30, and as it projects forwardly it tilts the wobble plate 294 which is operably connected through switch arm 35a with the over ride switch 35 which closes the circuit to the main cam shaft motor 21.

The stop arm 30, which scans the selector pins 29, is hinged at 301 to a mounting plate 302. Forwardly of the mounting plate there is a balancing arm 303, Figs. 4 and 5. The hub of the arm 303 is keyed to the cam shaft 23 while the mounting plate 302 with the scanning stop arm 30 is freely rotatable on a hub having its bearing about the hub of said arm. The plate 302 carries the oppositely disposed positioning switch 33 and leveling switch 34, while the balancing arm 303 carries oppositely disposed and adjustable contact screws 330 and 340, respectively. The mounting plate 302 is connected by a spring 304 with a finger of the balancing arm 303 at 305, urging said finger against a projection 306 on the mounting plate 302 for normally holding the balancing arm 303 therewith during its driving action. Upon the stop arm 30 engaging a pin 29, said arm and its mounting plate are arrested, but the balancing arm 303 continues to be driven beyond such position to provide a gap between finger 305 and projection 306. It then oscillates between switches 53 and 34 until it comes to a balanced rest positioned with said gap. Interposed between the stop arm 30 and its mounting plate 302 there is a compression spring 307.

The cancelling out of the selector pin occurs upon the main cam shaft 36 starting its rotation, through a projection 308. Said projection engages one end of a cancelling out lever 309 fulcrumed at 310 on the selector plate 28. The free end of said lever is provided with a nipple which extends in alignment with the selector shaft 23 against the stop arm 30. Thus, upon the selector cam being positioned and the main cam shaft rotation initiated, the cancelling out lever will force the stop arm inwardly to retract and relatch the selector pin 29 against the tension of the spring 307. Immediately upon continued rotation of the main cam shaft 36 causing the cancelling out lever to be released from the projection 308, the spring 307 will return the stop arm to its scanning position.

Upon canceling out of the selector pin, as above described, the arm 30 is freed to permit spring 304 to draw finger 305 into abutment with the projection 306. This permits re-selection of said selected pin 29, or one of the adjacent pins without interference by the selector arm.

Thus as above described, upon a selected solenoid 290 being energized, the associated selector pin 29 will be released from the latching plate 292 under tension of the spring 291 into the path of the arm 30. In this position it tilts the wobble plate 294 to close the switch 35 through the arm 35a and energizes the main cam shaft motor 21, at the same time conditioning the selector motor 20 so that at the proper time for selecting cam actuation as governed by the cam shaft 36, the selector motor 20 will drive selector cam shaft 23. This shaft in turn rotates the balancing arm 303 which, through spring 304, causes rotation therewith of the mounting plate 302 and the scanning stop arm 30 until the stop arm engages the projected pin 29. The stop arm being thus arrested, together with its mounting plate and the switches 33, 34, continued movement of the shaft and balancing arm will cause the contact screw 330 to engage the positioning switch 33 to stop the motor 20 under dynamic braking action. Any further coasting will close switch 34 to remove the dynamic braking and reverse the motor. Upon reversal, the mounting plate is rotated counter-clockwise slightly, such oscillation continuing until the leveling switch is disengaged, which action will cause the balancing arm to finally come to rest at a balanced position, in which position the over travel in the positioning switch 33 breaks the circuit to the motor 20. In this final balanced position there will be a slight gap between the projection 306 on the mounting plate as and for the purpose above described.

The selection having been completed, the selected tray is swung from its magazine to present the record to the turntable. This is accomplished through the re-energization of the main cam shaft motor 21 to drive the main cam shaft 36.

Main cam shaft

As above stated, the cam shaft 36 is driven by the driving gear 38. (Figs. 1 and 5.) On its inner face it is provided with a camming groove 70 which operates the tray swinging mechanism to swing the selected record, according to the elevation of the selector rods 59, 60 into position for placement of the selected record upon the turntable, as hereinafter described (Fig. 9) and as disclosed in the above mentioned applications for Letters Patent, there being an interconnected rod between the tray take-out mechanisms of the dual magazines.

On the forward face of the cam gear 38 there is a camming groove 71 receiving a follower on a lever 72 secured to a turntable lifting arm 73 fulcrumed to a bracket depending from the frame at 74. The selected tray having been swung outwardly into concentric relation with the turntable drive shaft 15, the turntable is elevated through the upward swinging movement of the lifting arm 73 by its carriage 75 (Figs. 1 and 6).

The cam shaft 36 also drives a profile cam 76 having triple profiles, profile 77 conditioning the speed changing mechanism or turntable driver, the tone arm feed-in mechanism and the tone arm trip mechanism. (Fig. 7.) The second profile 78 operates the tone arm feed-in after being conditioned by its adjusting mechanism. The third profile 79 governs the setting of the reproducer on the record for reproduction, all as hereinafter more fully set forth and described. Also, carried by the cam shaft 36 there is a switch control cam 80 having the following lobes (Fig. 5). The lobe 81 closes the transfer switch 40. The lobe 82 closes the mute switch 46. The lobe 83 closes both the full cycle switch 41 when at one angular position and the play switch 43 when at a different or 180 degree angular position.

*Turntable*

As shown in Figs. 1 and 6, the turntable drive shaft 15 is slidable in a sleeve 90. Said sleeve is rotatably mounted and supported within a bearing 91 carried by and depending from the base plate 10. The lower end of the shaft bears on the carriage 75 and its upper end has secured thereto the turntable 14. Projecting above the turntable there is provided the usual centering pin 92 associated with a raised record supporting surface 93 which in turn comprises a second enlarged centering boss 94. The centering boss 94 has associated with it a lower record supporting surface 95.

As shown in Fig. 6, the usual centering pin 92 engages in the smaller centering aperture common to the 78 R. P. M. type of records indicated at R10. Upon the turntable picking up a record of this type from the selected tray, the centering pin 92 projects through its centering aperture and the record is supported upon the raised supporting surface 93. The enlarged centering boss 94 fits into an enlarged centering aperture common to the seven inch 45 R. P. M. type of record indicated at R7. Therefore, upon the turntable picking up a record of this type it is centered by the centering boss extending through its enlarged aperture and is supported at a lower elevation on the lower record supporting surface 95.

The centering pin 92 seats in a yielding alignment boss 96 slidably mounted in a fixed head 97 carried by an overhanging rigid bracket 98. Said boss has limited movement therein and is biased to its extended position by a compression spring 99. Thus, said boss not only aligns the centering pin and shaft and stabilizes it, but permits axial displacement of the pin and shaft to different positions depending upon the type of record carried by the turntable. The head 97 carries a series of peripherally disposed stabilizing rollers 100. They are rotatably mounted in spaced relation about the head to roll in a circular path just beyond the outer periphery of the centering boss 94. The purpose of said rollers is to bear upon and stabilize the record, as well as provide a record positioning abutment, whether of the R10 type or the R7 type of record. When the R10 type of record is moved upwardly upon the raised supporting surface 93, it is rotatably clamped between the rollers and supporting surface in a predetermined plane determined by said rollers. Similarly when an R7 type of record is received by the turntable, the turntable moves to a higher elevation to present such a record against the rollers.

The automatic control of the driving speed of the record, for example, at 78 R. P. M. or 45 R. P. M., as well as the feed-in position of the reproducer for the particular type of record and the tripping position thereof, is governed solely by the variation in axial displacement of the turntable or its elevation as governed by the diameter of the central opening of the record in the manner above described. This is accomplished in the following manner:

Secured to the lower end of the turntable drive 15 there is a driven disk 101. Said disk is adapted to be moved into frictional driving engagement with a driving disk 102 carried by the sleeve 90 and rotatable therewith about the shaft. Said driving disk is keyed to the sleeve so that it may be raised or lowered thereon through the lifting engagement of the driven disk 101. Thus, when an R10 type record is carried by the turntable, the shaft 15 will be at its lowermost driven position, as shown in Fig. 6. However, when an R7 type record is carried by the turntable, the turntable will be displaced upwardly to a higher elevation and, therefore, the driven disk when brought into engagement with the driving disk will lift it to a corresponding elevation.

For driving the disk 102 at different speeds there is provided a speed changing wheel 103 rotatably carried by a positioning bracket 104. The speed changing wheel carries a driving disk 103a movable into driving engagement with either the driving periphery 102a or 102b, depending upon the elevation of the turntable. Said wheel 103 has an outer driven disk 103b spaced upwardly from the disk 103a in position to be engaged and driven by an idler wheel 105. The idler wheel 105 is carried by a swinging bracket 105a and is in position to be engaged and be driven by a spindle 106 of the turntable motor 22. The positioning bracket 104 is spring biased by a tensioning spring 107 arranged to urge the speed changing wheel into joint driving engagement with the idler wheel 105 and one or the other driving peripheries 102a or 102b (see Fig. 7).

The speed changing wheel 103 is normally held from driving engagement against the tension of spring 107 by a bell crank lever 108 fulcrumed at 109 with one end pivotally connected at 110 to the positioning bracket and the other end connected to an adjustable link 111. The link 111 has its other end connected with a link arm 112 on a conditioning rod 113 supported by the bearings 114. The other end of the conditioning rod is connected through a link arm 115 with an adjustable connecting rod 116, the other end of which is connected with a bell crank lever 117 fulcrumed at 118. The other end of the bell crank lever is connected through a link 119 with a cam follower operating on the cam profile 77 of the cam 76.

The operation of this mechanism is as follows: After the selection has been made and the selected tray positioned to present a record to the turntable, the turntable is elevated in the manner above described until the record carried thereby abuts the stabilizing rollers 100. If the turntable has received an R10 type record of the smaller centering aperture, the elevation thereof will cause the driving disk 102 to be positioned with its driving periphery 102b in the plane of the driving periphery 103a of the speed changing wheel 103. During this operation the speed changing wheel 103 will be maintained by the bell crank lever 108 in a position beyond the outer driving periphery 102a.

The turntable and its driving disk being thus positioned at a predetermined elevation according to the record picked up thereby, the main cam shaft will actuate the bell crank 117 through profile 77 of cam 76 to oscillate the conditioning rod 113 and permit the tension spring 107 to draw the speed changing wheel 103 toward the driving disk 102 until the driving disk 103a engages the predetermined driving periphery 102a or 102b. At the same time said spring 107 will draw the wheel 103 into frictional contact with the idler wheel 105. The turntable motor will thereafter be caused to drive its spindle 106 and through the idler wheel and speed changing wheel will drive the turntable. The record on the turntable will accordingly be rotated at 78 R. P. M. if an R10 type record is carried thereby, through driving engagement between the disk 103a and driving periphery 102b. On the other hand, if an R7 type record is positioned on the turntable it will be moved to a higher elevation to bring the record on the lower record supporting surface 95 against the rollers 100, whereupon the driving disk will be elevated to present its driving periphery 102a to the driving disk 103a.

The positioning of the speed changing wheel 103, as above described, in turn conditions the proper positioning of the reproducer, both as to its feed-in and its tripping position for a record of either type.

*Reproducer positioning*

The inward positioning of the speed changing wheel for driving engagement with the driving periphery 102a or 102b, as above described, similarly limits the extent of oscillation of the conditioning rod 113. The conditioning rod has secured thereto a laterally extending arm 121 carrying a pair of vertically spaced stop screws 122 and 123. These stop screws are selectively positioned to be engaged by one end 124 of a bell crank lever 125 fulcrumed about a tone arm mounting post 126. If the speed changing wheel 103 moves in against the driving periphery 102b, it will thereby arrest the oscillation of the conditioning rod and present the longer stop screw 122 to the bell crank lever 125. But if the speed changing wheel moved a lesser distance into driving engagement with the periphery 102a, there will be less oscillation of the conditioning rod and the shorter screw 123 will be brought into stopping position.

With the record positioned for play, the turntable motor operating, and with the stops 122 and 123 positioned as above described, the cam profile 78 of the cam 76 will actuate a follower arm 127 to swing a bell crank lever 128 about its fulcrum 129 through a connecting rod 130. The other end of the bell crank lever is connected by a link 131 to an arm 132 which rotates about but free of the tone arm mounting post 126. The arm 132 is connected through a tension spring 133 with the bell crank lever 125. Secured to the tone arm shaft 17, rotatable within the mounting post, there is a trip switch lever 134 having an upwardly projecting pin 135 adapted to be engaged between the free end of the lever 125 and the arm 132.

Upon the cam 76 actuating the arm 132 through the link 131, said arm is caused to swing inwardly to the dotted line position shown in Fig. 7. Through the tension spring 133 it draws the lever 125 with it until the lever abuts one of the stop screws 122, 123, and is arrested thereby according to the type of the record to be reproduced. As the lever is drawn inwardly by the spring 133, its free end engages pin 135 and forces the trip switch lever 134 inwardly, which lever is connected to the shaft 17. Accordingly, the tone arm is swung inwardly by the lever 134 as far as the lever 125 is caused to swing, being limited in its inward movement by the stop screws at the proper feed-in position for the reproducer. As the reproducer travels inwardly of the record through the medium of the grooves therein, the trip switch lever 134 follows along until it engages a trip arm 136 on the trip switch 45.

It will be observed from the above that through the oscillation of the conditioning rod 113 and according to the position of the speed changing wheel 103, one or the other of the stop screws 122, 123 will be positioned for arresting the inward swinging movement of the tone arm and thereby the feed-in position of the reproducer. The shorter stop screw 123 is adjusted for properly setting the reproducer for play of the R7 type of record, and the screw 122 is adjusted to position the reproducer for an R10 type of record.

Since there are two tone arms and reproducers, one for reproducing the upper surface of the record and one for the lower, there are two mounting posts 126 and 126a associated with precisely the same corresponding parts above described, wherein the same numerals are applied with the addition of the letter "a". The arm 132, which is actuated by the link 131, is operably connected with a corresponding arm 132a through an elongated slot and pin connection 137. Thus, the same movement is transmitted to the arm 132a as to the arm 132. As shown in Fig. 8, the tone arm mounting post 126 mounts the tone arm carrying the upper reproducer 16 for playing the top side of the record, while the tone arm post 126a mounts the tone arm carrying the reproducer 18 for the under side of the record.

Since the tripping grooves of the different types of records are differently spaced from the axial center thereof, the position of the trip switch arm 136 must be adjusted as between the R7 type record and the R10 type record. This adjustment is similarly accomplished through the extent of oscillation of the conditioning rod 113. For that purpose there is provided a fixed mounting bracket 138 upon which there is pivotally supported a trip switch adjusting plate 139, said plate being pivotally connected with the mounting bracket at 140. Said plate 139 carries the trip switch 45 with its trip arm 136. A tension spring 141 is connected between the mounting bracket 138 and said plate for biasing it in a counter-clockwise direction (Fig. 7). Said plate is formed with a pair of abutments 142 and 143. An adjustable stop screw 145 is secured in a downwardly extending arm 146 secured by a collar 147 to the conditioning rod 113.

When an R10 type record is carried by the turntable, the adjusting plate 139 is positioned against the stop screw 144. In this position of the plate the trip switch arm 136 is so located that the trip switch lever 134 will engage it and close the trip switch circuit when the reproducer runs into the trip grooves of the R10 type record. When an R7 type record is placed on the turntable, the oscillation of the conditioning rod 113 will be such as to render the stop screw 145 effective to position the plate 139 and trip switch arm for engagement by the lever 134 at a greater distance from the record center. Thus, through the action of the conditioning rod 113, which is controlled by the extent of inward swinging movement of the speed changing wheel 103, the trip switch will be set for operation according to the respective positions of the tripping grooves of the respective records.

Upon the tone arm being swung to its selected feed-in position, as above described, it is lowered into engagement with the record groove if the upper side of the record is to be reproduced, or swung upwardly into groove engagement with the under side of the record if it is to be reproduced. This action takes place upon the reproducer being swung to its proper feed-in position, and is accomplished by the following mechanism (see Fig. 8):

Reproducer selection

The cam profile 79 carried on the cam 76 is circular and concentric with the cam shaft 36, other than having a dip 150 extending about 30 degrees of its peripheral surface. Riding on the profile 79 there is provided a cam follower 151 carried by one end of a bell crank lever 152 fulcrumed at 153. Said bell crank lever is connected by a link 154 to an arm 155 which in turn is connected to a finger 156 bearing on one end of a lever 157. The lever 157 is fulcrumed at 158 and is provided at its free end with a roller 159. Operated by the roller 159 there is a double arm lever 160 pivoted at 161 adjacent to which there is a double arm lever 162 pivoted at 163.

One arm of the lever 160 extends under the lower end of a tone arm raising and lowering rod 164 which slidably extends through the tone arm shaft 17. Similarly, one arm of the lever 162 is positioned to operate a tone arm raising and lowering rod 165 slidably mounted in the tone arm shaft 17a. The rod 164 is so associated with the upper tone arm that when it is raised by the lever 160 it elevates the reproducer from engagement with the record, and when lowered, positions the reproducer on the record for play. The rod 165 is so associated with the lower tone arm that when it is raised it fulcrums the lower tone arm to move the reproducer downwardly from record engagement. When the rod 165 is lowered, it releases the entire tone arm to permit it to be spring pressed to move the reproducer upwardly into playing position under spring tension, as schematically illustrated in Fig. 8.

Secured on the selector cam shaft 23 rotatable with the selector cam 31, there is provided a cam disk 166 immediately behind the cam 31 and the driving sprocket 24, as viewed in Fig. 2, for rotation to selected positions with the selector cam. The cam 166 is divided into four sections. Opposed sections approximately of 90 degrees each have raised profiles 167 while the intermediate sections have reduced profiles 168, profiles 167 being of greater radius than profiles 168. The lever 160 is formed with its other arm terminating in a lip 170, said lips engaging and bearing upon a profile of the cam 166.

The turntable motor reversing switch 44 carries a switch arm 171 which engages and bears against the profile of the cam 166. Adjacent the lip 169 there is a reproducer switch 172 having a switch arm 173 positioned for operative engagement by the arm 160. The reproducer switch 172 closes a circuit from the reproducer playing the upper side of the record which is controlled by the rod 164. There is also provided a reproducer switch 174 having a switch arm 175 positioned for engagement by the lever 162 adjacent its lip 170. This reproducer switch controls the circuit from the lower reproducer engaging the under side of the record as controlled by the rod 165.

In operation, during the record selection and changing cycle, the follower 151 rides on the outer contour of the cam 79 which holds the roller 159 in its uppermost position in the crotch of levers 160, 162. In its elevated position said levers are raised whereby the rod 164 holds its associated tone arm upwardly with the reproducer out of engagement with the record. The rod 165 is similarly held in its raised position which depresses the reproducer end of the tone arm free of record engagement. In their elevated position, the lips 169 and 170 are free of the cam 166 which rotates to a selected position with the selector cam 31. When the selection is made with the cam 166 thus positioned, one of the lips will engage the outer section 167 of the cam, while the other lip will be free to move inwardly into engagement with the inner section 168 of the cam.

The relation of the selector cam 31 to the cam 166 is such that its profile will select one of the twenty-six records in one of the magazines, while the cam 166 will determine which side of the selected record is to be reproduced. Thus, the lever engaging the outer section 167 will continue to hold its reproducer out of playing position while the lever entering the section 168 will condition its reproducer for record engagement. Actual record engagement occurs upon the follower 151 of selector 152 entering the notched profile at 150 in cam 179. This lowers the roller 159 which permits the conditioning lever 162 to swing downwardly with its lip entering the inner section of the cam 168, to thereby lower its associated tone arm control rod, the other lever being held in its upper position through engagement with the outer section of the cam. At the same time the reversible turntable motor 22 is energized according to the position of the switch 44 which determines the direction of rotation through the position of switch arm 171, either on the outer section 167 or dropping into the inner section 168 of cam 166.

Thus, if the upper reproducer is conditioned for play through the lowering of its rod 164, the switch 44 will cause the motor to drive the turntable clockwise. If the lower tone arm is conditioned through lowering of its control rod 165, the reversing switch will energize the motor to rotate the turntable in the opposite or counterclockwise direction. This action is governed by the particular selector pin 29 projected in the path of the scanning stop arm 30.

Tray swinging mechanism

The record to be played is selected as above described wherein the selector cam 31 raises or lowers the selector rods 59, 60 in the guideway 61 to effect interconnection with the selected record tray 13 (see Fig. 9). When so positioned, the selector rod effects interengagement between its latch member 180 and a tooth 181 on the selected tray. Each of said trays are pivotally mounted in column formation upon a vertical spindle 183 for swinging movement to and from the magazine. Upon such interengagement the tray is swung about the spindle 183 by a toothed segment 184 engaging with a toothed segment 185 provided on the end of a take-out arm 186. The toothed segment 184 is secured to a lever arm 187 fulcrumed at 188. The other end of said arm is connected by a link 189 to a crank arm 190 secured to a follower arm 191 carrying a cam follower 192 operating within the inner cam groove 70 of the gear wheel 38. The toothed segment 184 is pivotally connected through a connecting rod 193 with a corresponding toothed segment similarly associated with the tray takeout mechanism in the magazine 12.

Through the above described mechanism, both takeout arms 186 associated with the magazines 11, 12, respectively, are simultaneously swung to and from takeout positon by the toothed segments 184. It is to be understood that whereas both take-out mechanisms operate together simultaneously through the rod 193, only a single selected tray will be swung to or from the magazine depending upon the position of the selector rods 59, 60.

However, when a selected record tray is effected, depending upon the position of the selector rods, the timing of the cam is such that the selected tray is swung outwardly over the turntable after a selection has been made and just prior to the raising of the turntable to pick up the record and present it to the reproducer. The tray is caused to remain in its outward position during the playing of the record, and the lowering of the turntable following completion of its reproduction. Thereafter the cam causes the selected tray to be swung back into its magazine, ready for a different positioning of the selector rods to select a different tray and record to be reproduced.

The invention claimed is:

1. In an automatic record changer for phonographs, a vertically movable turntable, said turntable having an upper record supporting surface with a centering pin extending upwardly therefrom adapted to receive a record for reproduction at a given speed provided with a small centering aperture for centering engagement by said pin, said turntable having a lower depressed record supporting surface surrounding said first mentioned supporting surface for receiving a record for reproduction at a different speed with a larger centering aperture adapted to be centered about said first mentioned upper record supporting surface, means for biasing said turntable upwardly, a record engaging and stabilizing superstructure engageable by a record on one of said turntable surfaces to limit its upward movement and establish a predetermined elevation in reproducing position, whereby said turntable will be positioned at different predetermined elevations in its raised position according to the aperture of the record supported thereby, a turntable shaft secured to said turntable axially movable therewith, a pair of axially spaced driving discs of different diameters operably connected with said shaft movable to different elevations therewith in accordance with the elevation of said turntable, and a driving member selectively engageable with one of said driving discs according to the elevation thereof for driving said turntable at one speed when at one elevation, and engageable with the other said driving disc for driving the turntable at a different speed when at its other elevation.

2. In an automatic record changer for phonographs, a vertically movable turntable having a plurality of annular pyramided centering bosses for rotatably supporting at different heights records having, respectively, centering apertures of different diameters for reproduction at different speeds of rotation, means for raising said turntable, a member in the path of movement of a record on said turntable to limit the raised position thereof to different predetermined elevations according to the diameter of the centering aperture of the record to be reproduced, a driving motor, and a turntable driving mechanism operably associated with said driving motor and said turntable, said mechanism including mutually engageable disc members, one of which is vertically movable with said turntable and one of which has vertically spaced driving peripheries of different diameters for driving said turntable at one speed when said turntable is at one elevation and at another speed when said turntable is at another elevation.

3. In an automatic record changer for phonographs, a vertically movable turntable having a plurality of annular pyramided centering bosses for rotatably supporting at different axial positions records having, respectively, centering apertures of different diameters, means for raising said turntable, a member in the path of movement of a record on said turntable to limit the raised position thereof to different predetermined elevations according to the diameter of the centering aperture of the record to be reproduced, a turntable shaft movable with said turntable, a driving disc of one diameter operably connected with said turntable shaft, a second driving disc of a different diameter operably connected with said turntable shaft and axially spaced from said first driving disc according to the difference in the predetermined elevations of the turntable, and a driving member radially movable into driving engagement with either one of said discs for driving said turntable at a predetermined speed according to the diameter of the disc presented thereto by the turntable elevation.

4. In an automatic record changer for phonographs, a vertically movable turntable having a plurality of vertically spaced centering bosses of different diameters for supporting at different elevations records having centering apertures of different diameter for reproduction at different speeds of rotation, means for raising said turntable, a member in the path of movement of a record on said turntable to limit the raised position thereof to a predetermined elevation according to the diameter of the centering boss bearing the record to be reproduced, coaxially spaced discs of different diameters coupled to and alternatively movable with the turntable into a driving plane, and a driving mechanism in said plane and selectively movable into operative driving engagement with one or the other of said discs to rotate said turntable at one speed at one predetermined elevation and at a second speed when at a second predetermined elevation.

5. In an automatic record changer for phonographs, a vertically movable turntable, said turntable having an upper record supporting surface with a centering pin extending upwardly therefrom adapted to receive a record for reproduction at a given speed provided with a small centering aperture for centering engagement by said pin, said turntable having a lower depressed record supporting surface surrounding said first mentioned supporting surface for receiving a record for reproduction at a different speed with a larger centering aperture adapted to be centered about said first mentioned upper record supporting surface, means for moving said turntable upwardly, a record engaging and stabilizing superstructure engageable by a record on one of said turntable surfaces to limit its upward movement and establish a predetermined elevation in reproducing position, whereby said turntable will be positioned at different predetermined elevations in its raised position according to the diameter of the record supported thereby, a driving motor, and means for coupling said motor to said turntable at said different elevations in different coupling ratios for operatively driving said turntable at different speeds at said different elevations.

6. In an automatic record changer for phonographs, a vertically movable turntable, said turntable having an upper record supporting surface with a centering pin extending upwardly therefrom adapted to receive a record for reproduction at a given speed provided with a small centering aperture for centering engagement by said pin, said turntable having a lower record supporting surface spaced below and surrounding said first mentioned supporting surface for receiving a record for reproduction at a different speed with a larger centering aperture adapted to be centered about said first mentioned upper record supporting surface, means for moving said turntable upwardly, a record engaging and stabilizing superstructure engageable by a record on one of said turntable surfaces to limit its upward movement and establish a predetermined elevation in reproducing position, whereby said turntable will be positioned at different predetermined elevations in its reproducing position according to the aperture of the record supported thereby, a driving disc movable axially with said turntable to different elevations, and having two axially spaced peripheries of different diameters, and a driving member selectively engageable with the two peripheries of said driving disc according to its elevation.

7. In an automatic record changer for phonographs, a turntable having a plurality of spaced centering bosses of different diameters for receiving records having centering apertures of different diameters for reproduction at different speeds of rotation, a turntable elevating shaft secured to said turntable, means for axially displacing said shaft and turntable, a member engageable with a record on said turntable to control elevation of said shaft and limit axial displacement of said turntable in one direction according to the diameter of the centering aperture of the record to be reproduced and the boss supporting the record, a pair of spaced driving discs operably connected with said shaft for displacement therewith into a certain plane, and a driving member positioned relatively to said plane for engagement with one of said driving discs, said discs being of different diameter for rotating said turntable at different speeds upon being engaged by said driving member according to the shifted position of said driving discs relative thereto.

8. In an automatic record changer for phonographs, a turntable, means on the turntable supporting in a certain plane a record having a centering aperture of a certain diameter, a second means on the turntable for supporting in a different axially spaced plane a record having a centering aperture of a different diameter, said turntable being axially displaceable, a member engageable with a record on said turntable to limit its axial displacement in one direction to present each of said records for reproduction in a given plane of rotation, means for axially displacing said turntable to different degrees to engage records having apertures of different diameters with said member, a driving motor, and means responsive to different degrees of turntable displacement for coupling said motor to said turntable in different coupling ratios for operatively driving said turntable at different speeds.

9. In an automatic record changer for phonographs, a turntable for receiving records having centering apertures of different diameter for reproduction at different speeds of rotation, said turntable consisting of a plurality of stepped centering bosses for supporting records of different diameter apertures at different elevations, means for moving said turntable in a vertical plane and a fixed stop disposed above the record for engagement therewith so that the vertical position of said turntable in playing position becomes a function of aperture size of the record thereon, the record of one diameter of aperture having its feed-in groove and its tripping grooves spaced a different distance from its center than those of the record of a different diameter of aperture, a trip switch engageable by said reproducer upon reaching said tripping grooves, a pair of driving discs of different diameter operably connected with said turntable and movable axially therewith, a driving member selectively engageable, according to the axial movement of said discs, with one or the other of said driving discs at different distances from its center of rotation depending upon the diameter thereof for causing said records of different apertures to be rotated at different selective speeds of rotation, and spaced stop members positioned according to the positioning of said driving member for selectively controlling the positioning of the reproducer at the feed-in grooves of the record and adjusting said trip switch to be actuated upon the reproducer reaching the trip grooves of said record.

10. In an automatic record changer for phonographs, a vertically movable turntable for receiving records having centering apertures of different diameters for reproduction at different speeds of rotation, said turntable consisting of a plurality of stepped centering bosses for supporting records of different diameter apertures at different elevations, means for moving said turntable in a vertical plane and a fixed stop disposed above the record for engagement therewith so that the difference in diameter of the centering apertures determines the position of the turntable for reproduction of records thereon, said different apertured records having differently positioned feed-in and tripping grooves, a reproducer for engagement with said grooves, a trip switch engageable by said reproducer upon reaching the tripping grooves of the reproduced record, a driving motor, means for coupling said motor to said turntable at said different elevations in different coupling ratios for operatively driving said turntable at different speeds at said different elevations, and positioning means operably connected with said coupling means, according to the speed selected, to position the reproducer at the feed-in grooves of the said record and position said trip switch for actuation upon the reproducer reaching the trip grooves of said record.

References Cited in the file of this patent

UNITED STATES PATENTS

| | | |
|---|---|---|
| 2,113,401 | Goldsmith | Apr. 5, 1938 |
| 2,230,106 | Erwood | Jan. 28, 1941 |
| 2,287,560 | Osborne et al. | June 23, 1942 |
| 2,333,414 | De Tar | Nov. 2, 1943 |
| 2,416,583 | Hartley et al. | Feb. 25, 1947 |
| 2,531,374 | Andrews | Nov. 21, 1950 |
| 2,554,919 | Mullaney | May 29, 1951 |
| 2,579,175 | Dale | Dec. 18, 1951 |

FOREIGN PATENTS

| | | |
|---|---|---|
| 632,233 | Great Britain | Nov. 18, 1949 |